Feb. 11, 1941.     O. MADER     2,231,343
AERODYNAMIC MEANS FOR BRAKING AIRCRAFT
Filed March 2, 1938
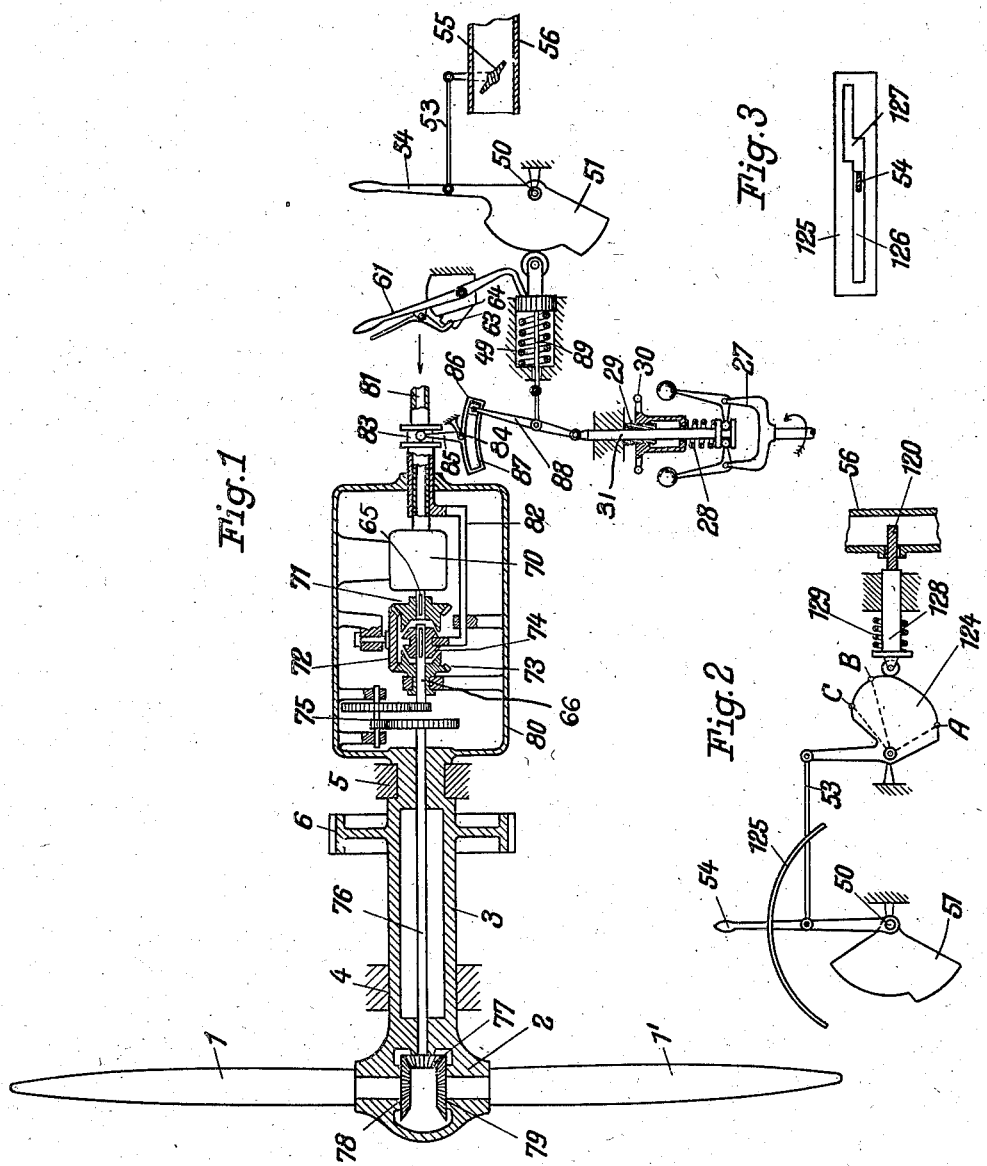
Inventor:
Otto Mader
by Michaelis & Michaelis,
Attys.

Patented Feb. 11, 1941

2,231,343

UNITED STATES PATENT OFFICE 2,231,343

AERODYNAMIC MEANS FOR BRAKING AIRCRAFT

Otto Mader, Dessau-Ziebigk, Germany

Application March 2, 1938, Serial No. 193,576
In Germany November 12, 1935

2 Claims. (Cl. 170—135.6)

This invention relates to means for braking aircraft and more especially airplanes during flight, for instance in a nose-dive, by means of their screw propellers.

Screw propellers have already been used for braking aircraft, and more especially airplanes, by adjusting their blades to a negative pitch, the propellers with the blades thus set creating a negative thrust, i. e. a force which acts towards braking the propulsion of the craft.

It has also been suggested to effect the setting of the blades of variable pitch propellers during normal flight by means of an auxiliary force and to control the action of this auxiliary force by means of a member influenced by speed, for instance by means of a centrifugal governor, in such manner that the number of rotations of the propeller remains constant. In such mechanisms the speed-sensitive member is connected with a control mechanism, which switches in and out the auxiliary force serving to effect the setting of the blades. Adjustment of this control mechanism from the neutral position to one side causes the blades to be set in one sense, adjustment to the other side a setting of the blades in the opposite sense, so that the direction, in which this control mechanism is adjusted, also determines the direction in which the blades are set.

It is an object of my invention to provide means whereby a variable pitch propeller is placed also within the range of negative angles of incidence, i. e. while the blades are relied upon to exert a braking action, under the influence of a speed-sensitive member in such manner, that also during the braking period the predetermined number of rotations of the propeller is kept automatically constant.

According to my invention the speed-sensitive member is connected with the member, which controls the action of the auxiliary force, not directly, but by means of intermediate members, which enable the direction in which the control member is being adjusted to be reversed whenever the speed-sensitive member is deflected in a predetermined direction.

In the drawing affixed to this specification and forming part thereof an embodiment of my invention is illustrated by way of example in a purely diagrammatic manner.

In the drawing:

Fig. 1 is an axial section;

Fig. 2 illustrates an additional mechanism; and

Fig. 3 shows a detail belonging to Fig. 2.

Referring to the drawing and first to Fig. 1, 1, 1' are the blades of the variable pitch propeller and 2 is the hub of the propeller shaft 3 in which the blades are mounted for angular movement about their axes. 4, 5 are the bearings supporting the propeller shaft and 6 is a gear transmitting power to the shaft from the engine (not shown). The propeller blades 1, 1' are set by a member which permanently rotates in one direction, for instance, by the shaft 65 of an auxiliary motor 70, this shaft being connected to a reversing gear comprising the beveled gears 71, 72, 73 and the clutch member 74, which latter is mounted for displacement, but secured against rotation on a shaft 66 and can be coupled with one of the wheels 71, 73, which rotate in opposite directions, whereby shaft 66 is driven in one or the other sense. Shaft 66 is connected by means of a reduction gear 75 and a shaft 76 with the beveled gear 77 meshing with the cog wheels 78, 79 fixed on the axis of the propeller blades 1, 1' respectively.

The auxiliary motor and the gears are mounted in a casing 80 which rotates together with the propeller shaft 3. The auxiliary motor is supplied with energy for instance through a central conduit 81. The gear change rod 82 for shifting the clutch member 74 also projects centrally from the casing 80, being formed with an annular groove 83, into which projects one arm 85 of a lever rockable about the fixed point 84, the other arms 86, 87 of the lever form a closed link. A connecting rod 88 projects into the link 86, 87; the other end of rod 88 is connected to the spindle 31 of the centrifugal governor 27, which is in turn connected to a part rotating together with the propeller shaft 3, so that its number of rotations is proportionate to that of the propeller. The spring 28 which counteracts the centrifugal force of the governor weights can be more or less compressed by means of a hand wheel 30, which can be adjusted by screwing on a threaded part 29. In this manner the number of rotations, which the governor is intended to keep constant, can be varied.

To the rod 88 is linked a rod 89, which is acted upon by a spring 49 and can be shifted to and fro by means of a cam 51 rockable about point 50 by means of a lever 54, or by a hand lever 61. To the lever 54 is also connected by means of a rod 53 the member (for instance a throttle) 55 in the suction pipe 56 of the engine which controls the supply of fuel to the engine which drives the propeller shaft. The cam 51 is so shaped and combined with the hand lever 54 in such manner, that during normal flight, while the throttle 55 is in the open position, the connecting rod 88 coacts with the arm 86 of the lever 85, 86, 87, while, when changing over to running idle, when the throttle 55 is almost closed, the connecting rod 88 is shifted into a position in which it coacts with the lever arm 87.

In the case first mentioned, i. e. during normal flight, when the rod 88 acts on the lever arm 86, a deflection of the centrifugal governor corresponding to an increase of speed causes the sleeve 83 and the clutch member 74 to be shifted towards the left, whereby the clutch member 74 is coupled with the beveled gear 73 and now drives the shaft 76 in the sense of an increase of the positive pitch of the propeller blades 1, 1'. A deflection of the centrifugal governor in the sense of a reduction of speed causes the clutch member 74 to be shifted towards the right and to be coupled with cog wheel 71 which rotates in a direction counter to that of wheel 73. Consequently the shaft 66 is now driven in the sense of a reduction of the positive pitch of the propeller blades 1, 1'.

In the other case, when the connecting rod 88 acts on the lever arm 87 and a braking action is exerted on the craft, whenever the centrifugal governor is farther deflected, the clutch member 74 is shifted to the right into contact with the cog wheel 71, so that now the propeller blades are adjusted in the sense of a reduction of the positive pitch down to the range of negative pitch, until the resistance, which the screw propeller offers to rotation at the number of rotations, for which the centrifugal governor has been set, has become equal to the driving torque. On the other hand, when the centrifugal governor is less deflected, the clutch body 74 is shifted towards the left and coupled with the cog wheel 73, whereby the propeller blades are set in the sense of an increased pitch, i. e. in the sense of a diminution of their negative pitch. Thus in the last mentioned case, when the craft is being braked, setting of the propeller blades is effected at each increase and similarly at each reduction of speed in a sense opposite to that in the case first mentioned, i. e. during normal flight.

By means of the hand lever 61, which can be fixed in two positions by means of the notches 63 and 64, rod 88 can be set to, and held in, the position corresponding to braked flight also if the lever 54 does not occupy the position of idle running. Also when the screw propeller is at rest or rotates only slowly, for instance due to the relative wind, the above combination of parts enables the propeller blades to be set to a position of great positive pitch, at which the propeller is in full feathering position to give the least wind resistance. To obtain the full feathering pitch, the blades are adjusted by the elements used to turn the blades to a negative pitch. Since in such a case the centrifugal governor is also at rest or rotates only slowly, the governor spring 28 shifts the spindle 31 into the low position corresponding to a reduction of speed. In this position of the parts the clutch member 74 is coupled with the beveled gear 73 and the propeller blades are therefore adjusted by the auxiliary motor 70 in the sense of an increase of pitch until they have reached the position, fixed by a stop or the like, in which the propeller offers the least resistance. On this position being reached, either the auxiliary motor 70 may be stopped or the friction coupling provided between the parts 73, 74 may be allowed to slip.

The means for varying the fuel supply to the propeller engine may further be so arranged that also during braked flight an increased fuel supply can be provided for.

Means for obtaining this are illustrated in Fig. 2, where the rod 53 linked to the gas lever 54 is connected to a cam disk 124, against the circumference of which is permanently pressed a plunger 128 by the spring 129. On the plunger 128 is mounted a throttling member having the form of a slide 120 extending across a slot in the wall of the mixture supply pipe 56. The radii of the cam disk steadily increase in length from point A to point B and decrease again constantly from point B to point C. If point A faces the plunger 128, the parts are adjusted for the largest fuel supply, at point B for the smallest and at point C for a larger supply. During normal flight the gas lever 54 is only rocked within the range between points A and B according to the load to be placed on the engine. The cam 51 serving to set the mechanism 88, 89 is so shaped that it will keep this mechanism adjusted for braked flight as long as the part B—C of the cam disk faces the plunger 128. Thus if the cam disk 124 is turned into this position, after the idle running position B has been overstepped, the propeller blades, being set to braking position, are now driven again with greater force and consequently also the negative thrust generated by them and the braking effect are increased.

In order to prevent the pilot from erroneously adjusting the gas lever during normal flight beyond the position of idle running (which might become dangerous, because then the engine, instead of running idle, would be supplied with an increased quantity of fuel) I prefer arranging in the path of the gas lever an obstacle serving to prevent it from being moved beyond its position of idle running, so that the pilot, if he should wish to turn the lever farther, is forced to first remove this obstacle. I may for instance guide the lever in a gate 125 (Fig. 3), the slot 126 of which is formed with a step 127 at the point corresponding to the position of the gas lever at point B, so that the lever, in order to be moved farther, must be imparted a lateral rocking movement.

It should be noted that in the present invention the kind of auxiliary force, which causes the propeller blades to be set, is of no avail, it being only important that the direction can be reversed, in which the speed-sensitive member, at a predetermined variation of the speed, adjusts a member controlling the auxiliary force, the direction in which this member is adjusted at the same time determining the direction in which the blades are adjusted.

Therefore, the invention is not only applicable to the example shown in the drawing, in which the auxiliary force is derived from a permanently rotating shaft. My invention is applicable also in the case where adjustment of the propeller blades is effected by auxiliary forces of a different kind, provided only that a permanently available auxiliary force is controlled by a control member in such manner that corresponding to the direction, in which this member is adjusted, the auxiliary force causes the blades to be adjusted in one or the other direction.

The auxiliary motor 70 may be of any type, as for example a mechanical, hydraulic, electric, or compressed air motor.

I wish it to be understood that I do not desire to be limited to the exact details of construction shown and described for obvious modifications will occur to a person skilled in the art.

I claim:

1. In combination with an engine having a throttle valve, a propeller of the variable pitch constant speed type, and a governor responsive to engine speed, means for varying the pitch of said propeller comprising a uni-directional motor, gear means for connecting said motor to the blades of said propeller, gear shift means operable by said governor for adjusting said gear means to turn the propeller blades to maintain a constant engine speed, and means controllable with said throttle valve for reversing the direction of operation of said gear shift means by said governor and for shutting off fuel supply to said engine when said blades are changed from a positive to a negative pitch, and for maintaining an open throttle valve when said blades have a negative pitch.

2. In the combination of claim 1, said means controllable with said throttle valve comprising a lever, rod means joining said lever to said valve, and cam means operated by said lever for varying the direction of operation of said gear shift means by said governor.

OTTO MADER.